Patented Sept. 8, 1931

1,822,720

UNITED STATES PATENT OFFICE

LE ROY L. WYMAN, OF SCHENECTADY, NEW YORK, ASSIGNOR TO GENERAL ELECTRIC COMPANY, A CORPORATION OF NEW YORK

METALLIC COMPOSITION AND PROCESS OF PREPARING THE SAME

No Drawing. Application filed July 15, 1929. Serial No. 378,587.

This invention relates to new and useful metallic compositions having incorporated therein grain growth inhibitors and to the process of preparing the same.

The invention comprises in general an improved metallic composition of the character set forth in the patent to Karl Schröter, No. 1,549,615, granted August 11, 1925, and in the application of Karl Schröter, Serial No. 104,613, filed April 26, 1926, now Patent No. 1,721,416, granted July 16, 1929, and assigned to the same assignee as the present application. The Schröter composition consists, in general, of a carbide of an element of the sixth group in the Mendelejeff Periodic System of Elements, together with an auxiliary metal of the iron group in this periodic system. Preferably tungsten carbide with about 3 to about 20 to 25% of cobalt is employed. Ordinarily, the product contains about 6 to 15% cobalt, with the remainder tungsten carbide, and is in the form of a sintered product, the sintering taking place at about 1375° C. to about 1425° C. depending upon the percent of cobalt in the composition and the time of sintering.

After considerable experience with the manufacture of cemented tungsten carbide wire drawing dies, I have observed that the heating operations coarsen the material. To overcome this coarsening, in accordance with my invention, I prepare a composition of the type set forth above, incorporating during the process of preparation, a grain growth inhibitor. By the use of such an inhibitor the finished product comes out finer grained, more uniform and with fewer voids or cavities, while the hardness and strength are correspondingly increased.

As a specific example of my invention, I mention the use of thoria, $ThO_2$, as a grain growth inhibitor. I have found that if I prepare a product of the type set forth so that it contains a few percent of thorium, preferably in the form of the oxide, thoria, an improved product is obtained which is particularly useful in the production of drawing dies. This improved composition has been found to be harder in character than the composition described in the Schröter patents, and shows consistently a Rockwell hardness about one point higher than that of the patented composition. In wire drawing dies, especially dies used in drawing tungsten and molybdenum wire, it has consistently given better results than the patented composition referred to above. The life of dies in which this metallic composition has been used has been prolonged usually about 10 to 12% over that of ordinary dies made from the metallic composition set forth in the patents referred to above.

In carrying out my invention I may employ the following process: An important point is to obtain an intimate mixture of tungsten and thoria before carbonizing. In order to obtain such a mixture I may start with tungstic oxide and a solution of thorium nitrate. Thorium nitrate is particularly well adapted for the purposes of my invention, since it yields thoria when decomposed. A solution of thorium nitrate is used such that the amount of water present will be sufficient to form a slurry with the amount of tungstic oxide used. The amount of thorium nitrate used is such that the desired amount of thoria is retained after the tungstic oxide has been reduced to tungsten powder. The slurry of the thorium nitrate and the tungstic oxide is dried to remove the water. Such drying operation may be carried out on to a steam bath, but any other suitable method may be employed. The mixture is then reduced. The tungsten oxide yields tungsten, and the thorium nitrate decomposes to thoria. This mass is in the form of an intimate mixture of these two substances.

Instead of starting with the slurry of thorium nitrate and tungstic oxide, I may use other methods of obtaining this intimate mixture of tungsten and thoria. For example, I may start with a slurry of tungsten and thorium nitrate, or, instead of using a slurry of these materials, I may mechanically intimately mill mixtures of either tungstic oxide and thorium nitrate, or tungsten and thorium nitrate, or, I may start with a powdered intimate mixture of tungstic oxide and thoria. In any case the mixture upon reduction yields an intimate mixture of tungsten and thoria.

This mixture of tungsten and thoria is then carbonized. The carbonizing process is substantially the same as the carbonizing process in the Schröter patents. The tungsten is thereby converted to the carbide, but the thoria remains practically unaffected by the carbon, since it is very stable, so that the yield is tungsten carbide and thoria. The mixture of these two substances is then milled with cobalt, the amount of cobalt used being such that the desired percentage of cobalt in the finished product is obtained. The milled mixture is pressed, and sintered at a suitable temperature which depends upon the composition used. For example, if the metallic composition contains about 13% cobalt, a suitable temperature at which the pressed mixture may be sintered is about 1375° C.

The sintered product obtained is extremely hard and homogeneous. It has all the properties of the metallic composition set forth in the patents cited, and, in addition, has the added properties and advantages set forth above. The final product contains thorium mainly as thoria, but there may be some thorium present in the form of the element itself. The range of thoria which may be incorporated in the product is considerable. I have employed with success various amounts, from about 0.5% to about 3%.

While I have specifically illustrated my invention by citing thoria as a grain growth inhibitor which may be used in carrying out my invention, the invention is obviously not limited to the use of this particular substance, for any equivalent grain growth inhibitor may be employed.

The product of my invention is particularly useful as a wire drawing die, but its use is not limited thereto. It is, for example, suitable for use as a cutting tool.

What I claim as new and desire to secure by Letters Patent of the United States, is:

1. The process of making a metallic composition of the type set forth, which comprises obtaining an intimate mixture of tungsten and thoria, converting the tungsten in the mixture to the carbide, adding cobalt, and pressing and sintering.

2. The process of making a metallic composition of the type set forth, which comprises forming a slurry of suitable proportions of tungstic oxide and thorium nitrate, the proportions used being such that the desired percentage of tungsten and thoria will be present in the finished product, drying this mixture, reducing it at a suitable temperature, carbonizing the reduced mass, adding cobalt thereto, pressing and sintering the product.

3. A metallic composition consisting mainly of a carbide of an element of the sixth group in Mendelejeff's Periodic System of Elements and containing an appreciable amount, but not more than 25% of a metal of the iron group, and a few percent of thoria.

4. A metallic composition comprising mainly tungsten carbide, cobalt up to about 25%, and thoria up to about 3%.

5. A sintered metallic composition consisting mainly of tungsten carbide, an amount of cobalt up to about 25%, and a few percent of thoria.

6. A wire drawing die composed mainly of tungsten carbide, cobalt up to about 25%, and a few percent of thoria.

7. A sintered wire drawing die consisting mainly of tungsten carbide, but containing about 13% cobalt and thoria up to about 3%.

8. The process of making a metallic composition of the type set forth, which composition of the type set forth, which comprises obtaining an intimate mixture of an element of the sixth group in Mendelejeff's Periodic System of Elements and thoria, converting said element to the carbide, adding an auxiliary metal of the iron group, and pressing and sintering.

In witness whereof, I have hereto set my hand this 13th day of July, 1929.

LE ROY L. WYMAN.